(12) United States Patent
Aiki et al.

(10) Patent No.: US 9,789,785 B2
(45) Date of Patent: Oct. 17, 2017

(54) DRIVING POWER DISTRIBUTION DEVICE

(71) Applicant: KABUSHIKI KAISHA TOYOTA CHUO KENKYUSHO, Nagakute-shi, Aichi-ken (JP)

(72) Inventors: Kosuke Aiki, Nagakute (JP); Hideo Nakai, Nagakute (JP); Yoshihiro Mizuno, Nagakute (JP); Eiji Tsuchiya, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 15/014,919

(22) Filed: Feb. 3, 2016

(65) Prior Publication Data

US 2016/0257221 A1   Sep. 8, 2016

(30) Foreign Application Priority Data

Mar. 6, 2015 (JP) ................ 2015-045116

(51) Int. Cl.
| | |
|---|---|
| H02P 3/18 | (2006.01) |
| H02P 23/00 | (2016.01) |
| H02P 25/00 | (2006.01) |
| B60L 15/20 | (2006.01) |
| H02P 27/06 | (2006.01) |
| H02P 5/46 | (2006.01) |

(52) U.S. Cl.
CPC ............ *B60L 15/2036* (2013.01); *H02P 5/46* (2013.01); *H02P 27/06* (2013.01); *Y02T 10/644* (2013.01); *Y02T 10/7275* (2013.01)

(58) Field of Classification Search
CPC ......... B60L 15/2036; H02P 5/46; H02P 27/06

USPC ................................................ 318/757, 112
See application file for complete search history.

(56) References Cited

U.S. PATENT DOCUMENTS

| | | | | |
|---|---|---|---|---|
| 4,825,131 A * | 4/1989 | Nozaki | ..................... | B60L 9/22 180/197 |
| 9,139,195 B2 * | 9/2015 | Noguchi | .................. | B60K 1/02 |
| 2004/0200654 A1 | 10/2004 | Hatsuda et al. | | |
| 2007/0273310 A1* | 11/2007 | Foch | ........................ | H02P 6/04 318/112 |

FOREIGN PATENT DOCUMENTS

| | | |
|---|---|---|
| JP | 2001-28804 A | 1/2001 |
| JP | 2004-328991 A | 11/2004 |
| JP | 2007-131108 A | 5/2007 |
| JP | 2007-186130 A | 7/2007 |

(Continued)

OTHER PUBLICATIONS

Mizuno, Takayuki et al. "Basic Principle and Maximum Torque Characteristics of a Six-Phase Pole Change Induction Motor for Electric Vehicles," T.IEE Japan, vol. 116-D, No. 3, pp. 256-264, 1996.

(Continued)

*Primary Examiner* — Erick Glass
(74) *Attorney, Agent, or Firm* — Oliff PLC

(57) ABSTRACT

When a rotational difference is generated between a left driving wheel and a right driving wheel, by controlling the frequency f0 of alternating currents to be fed to stator windings of first and second induction machines by a shared inverter, torque distribution to the left driving wheel and the right driving wheel is controlled.

14 Claims, 12 Drawing Sheets

(56) References Cited

FOREIGN PATENT DOCUMENTS

| JP | 2009-027814 A | 2/2009 |
|---|---|---|
| JP | 2014-023169 A | 2/2014 |
| WO | 2014/002129 A1 | 1/2014 |

OTHER PUBLICATIONS

Jul. 18, 2017 Office Action issued in Japanese Patent Application No. 2015-045116.

* cited by examiner

DRIVING POWER DISTRIBUTION DEVICE

PRIORITY INFORMATION

This application claims priority to Japanese Patent Application No. 2015-045116 filed on Mar. 6, 2015, which is incorporated herein by reference in its entirety.

TECHNICAL FIELD

The present invention relates to a driving power distribution device that adjusts torque distribution to a first drive shaft and a second drive shaft.

BACKGROUND ART

There are disclosures of techniques relating to this kind of a driving power distribution device. A driving power distribution device has a first motor that drives a left driving wheel of a vehicle, a second motor that drives a right driving wheel of the vehicle, a first inverter that applies an alternating current to the first motor, and a second inverter that applies an alternating current to the second motor. Torque distribution to the left driving wheel and the right driving wheel is controlled by controlling a torque of the first motor by switching operation of the first inverter and by controlling a torque of the second motor by switching operation of the second inverter.

In order to control torque distribution to the left driving wheel and the right driving wheel, it is necessary to independently control alternating current to be fed to the first motor and alternating current to be fed to the second motor, and provide two inverters; i.e., the first inverter that performs switching operation for controlling alternating current of the first motor and the second inverter that performs switching operation for controlling alternating current of the second motor. As a result, a structure for adjusting torque distribution to the left driving wheel and the right driving wheel is enlarged and complicated.

SUMMARY OF INVENTION

Technical Problem

The driving power distribution device according to the present invention adopts the following means, in order to solve the above-described problem.

Solution to Problem

The driving power distribution device according to the present invention is a driving power distribution device that adjusts torque distribution to a first drive shaft and a second drive shaft, and the device has a first induction machine that transmits a torque to the first drive shaft, a second induction machine that transmits a torque to the second drive shaft, and a shared power conversion system that applies common alternating currents to the first induction machine and the second induction machine, and in this device, the frequency of the common alternating currents is set based on the rotational speed and a target torque value of the first induction machine and the rotational speed and a target torque value of the second induction machine.

According to an aspect of the present application, it is preferable that the amplitude of the common alternating currents is set based on the rotational speed and the target torque value of the first induction machine and the rotational speed and the target torque value of the second induction machine.

According to an aspect of the present application, it is preferable that a difference in the number of poles between the first induction machine and the second induction machine is changeable, and that the frequency of the common alternating currents and the difference in the number of poles are set based on the rotational speed and the target torque value of the first induction machine and the rotational speed and the target torque value of the second induction machine.

According to an aspect of the present application, it is preferable that when a rotational difference is generated between the first induction machine and the second induction machine, in order to adjust the frequency of the common alternating currents so as to apply a driving torque to, of the first and second induction machines, the induction machine having a higher rotational speed and apply a braking torque to the induction machine having a lower rotational speed, the difference in the number of poles is set such that the number of poles of the induction machine having the higher rotational speed becomes smaller than the number of poles of the induction machine having the lower rotational speed.

According to an aspect of the present application, it is preferable that when a rotational difference is generated between the first induction machine and the second induction machine, in order to adjust the frequency of the common alternating currents so as to apply a braking torque to, of the first and second induction machines, the induction machine having a higher rotational speed and apply a driving torque to the induction machine having a lower rotational speed, the difference in the number of poles is set such that the number of poles of the induction machine having the higher rotational speed becomes equal to or greater than the number of poles of the induction machine having the lower rotational speed.

According to an aspect of the present application, it is preferable that a difference between a transmission gear ratio on the first drive shaft side, which is a transmission gear ratio from the first induction machine to the first drive shaft, and a transmission gear ratio on the second drive shaft side, which is a transmission gear ratio from the second induction machine to the second drive shaft, is changeable, and that a difference in the transmission gear ratio between the first drive shaft and the second drive shaft is set based on the rotational speed and a target torque value of the first induction machine and the rotational speed and a target torque value of the second induction machine.

According to an aspect of the present application, it is preferable that when a rotational difference is generated between the first drive shaft and the second drive shaft, in order to adjust the frequency of the common alternating currents so as to apply a driving torque to, of the first and second drive shafts, the drive shaft having a higher rotational speed and apply a braking torque to the drive shaft having a lower rotational speed, the difference in the transmission gear ratio is set such that the transmission gear ratio on the side of the drive shaft having the higher rotational speed becomes smaller than the transmission gear ratio on the side of the drive shaft having the lower rotational speed.

According to an aspect of the present application, it is preferable that when a rotational difference is generated between the first drive shaft and the second drive shaft, in order to adjust the frequency of the common alternating currents so as to apply a braking torque to, of the first and second drive shafts, the drive shaft having a higher rotational speed and apply a driving torque to the drive shaft having a lower rotational speed, the difference in the transmission gear ratio is set such that the transmission gear ratio on the side of the drive shaft having the higher rotational speed becomes equal to or greater than the transmission gear ratio on the side of the drive shaft having the lower rotational speed.

According to an aspect of the present application, it is preferable that the first drive shaft rotates with one of a left driving wheel and a right driving wheel of a vehicle, and that the second drive shaft rotates with the other one of the left driving wheel and the right driving wheel of the vehicle.

DESCRIPTION OF EMBODIMENTS

Hereinafter, an embodiment for performing the present invention (hereinafter referred to as an embodiment) will be described by reference to the drawings.

Figure 1:
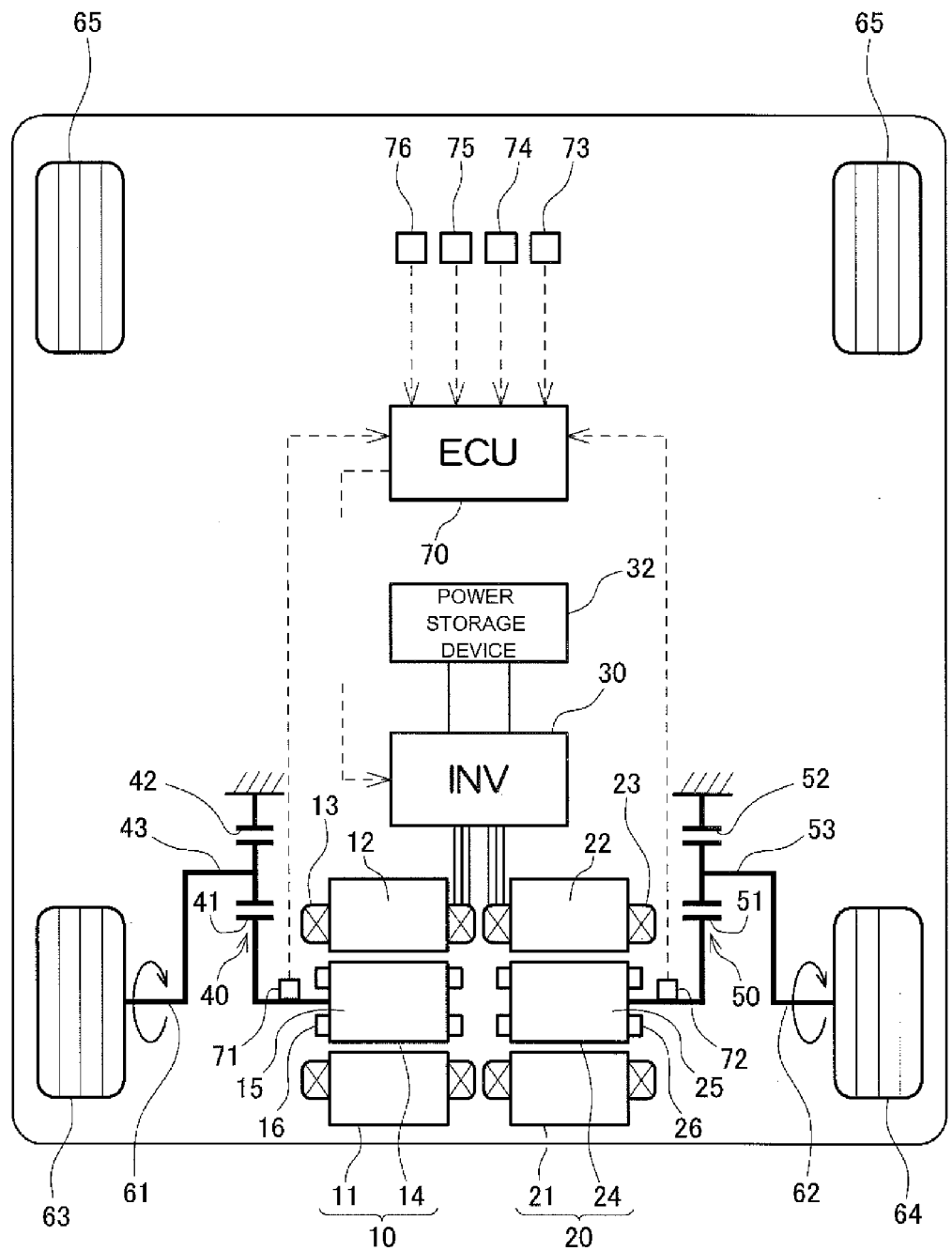
FIG. 1 shows a schematic configuration diagram of the driving power distribution device according to an embodiment of the present invention.

FIG. 1 shows a schematic configuration diagram of the driving power distribution device according to an embodiment of the present invention. The driving power distribution device according to the present embodiment has, in a vehicle, a below-described first induction machine 10, a second induction machine 20, a shared inverter 30, a power storage device 32, a first deceleration mechanism 40, and a second deceleration mechanism 50.

The first induction machine 10 has a first stator 11 and a first rotor 14 that faces the first stator 11 with a predetermined gap therebetween. The first stator 11 has a stator core 12 and a three-phase stator winding (primary winding) 13 disposed on the stator core 12 along the circumferential direction of the stator core 12. The first rotor 14 has a rotor core 15 and a three-phase stator winding (secondary winding) 16 disposed on the rotor core 15 along the circumferential direction of the rotor core 15. In the first induction machine 10, when three-phase alternating current flows through the three-phase stator winding 13, a rotating magnetic field is generated around the first stator 11, and the rotating magnetic field of the first stator 11 acts on the first rotor 14, thereby generating induced current (alternating current) in the three-phase rotor winding 16. Subsequently, electromagnetic mutual action between the rotating magnetic field of the first stator 11 and the induced current in the rotor winding 16 causes a torque to act between the first stator 11 and the first rotor 14, thereby driving the first rotor 14 to rotate. The first induction machine 10 can operate as an electric motor or can operate as a generator. A cage conductor may be disposed on the first rotor 14, in place of the rotor winding 16.

Likewise, the second induction machine 20 also has a second stator 21 and a second rotor 24 that faces the second stator 21 with a predetermined gap therebetween. The second stator 21 has a stator core 22 and a three-phase stator winding (primary winding) 23 disposed on the stator core 22 along the circumferential direction of the stator core 22. The second rotor 24 has a rotor core 25 and a three-phase stator winding (secondary winding) 26 disposed on the rotor core 25 along the circumferential direction of the rotor core 25. Also, in the second induction machine 20, when three-phase alternating current flows through the three-phase stator winding 23, a rotating magnetic field is generated around the second stator 21, and the rotating magnetic field of the second stator 21 acts on the second rotor 24, thereby generating induced current (alternating current) in the three-phase rotor winding 26. Subsequently, electromagnetic mutual action between the rotating magnetic field of the second stator 21 and the induced current in the rotor winding 26 causes a torque to act between the second stator 21 and the second rotor 24, thereby driving the second rotor 24 to rotate. The second induction machine 20 also can operate as an electric motor or can operate as a generator. A cage conductor may be disposed on the second rotor 24, in place of the rotor winding 26. The first induction machine 10 and the second induction machine 20 are designed such that they have equal numbers of poles and have equal torque characteristics with respect to slipping when common alternating currents are fed to the stator windings 13 and 23.

A torque of the first rotor 14 of the first induction machine 10 is transmitted to a first drive shaft 61 via the first deceleration mechanism (first speed change mechanism) 40. In the example in FIG. 1, the first deceleration mechanism 40 is composed of a planetary gear mechanism including a sun gear 41, a ring gear 42, and a carrier 43. The sun gear 41 is mechanically engaged with the first rotor 14, and the carrier 43 is mechanically engaged with the first drive shaft 61, thereby fixing rotation of the ring gear 42. The first deceleration mechanism 40 decelerates power from the first rotor 14 and transmits the resulting power to the first drive shaft 61. Assuming that the ratio of the number of teeth between the sun gear 41 and the ring gear 42 is ρ1 (0<ρ1<1), the deceleration ratio G1 of the first deceleration mechanism 40 (the transmission gear ratio on the first drive shaft 61 side, which is the transmission gear ratio from the first rotor 14 to the first drive shaft 61) is expressed as (1+ρ1)/ρ1. The first drive shaft 61 is mechanically engaged with one of a left driving wheel 63 and a right driving wheel 64 of the vehicle (in the example of FIG. 1, the left driving wheel 63), and rotates integrally with the left driving wheel 63 at the same rotational speed. By applying a torque to the first rotor 14 in the same direction as the rotational direction of the first rotor 14, it is possible to apply a driving torque to the left driving wheel 63 (first drive shaft 61). Meanwhile, by applying a torque to the first rotor 14 in the direction opposite to the rotational direction of the first rotor 14, it is possible to apply a braking torque to the left driving wheel 63 (first drive shaft 61).

A torque of the second rotor 24 of the second induction machine 20 is transmitted to a second drive shaft (second drive shaft) 62 via the second deceleration mechanism (second speed change mechanism) 50. In the example in FIG. 1, the second deceleration mechanism 50 is also composed of a planetary gear mechanism including a sun gear 51, a ring gear 52, and a carrier 53. The sun gear 51 is mechanically engaged with the second rotor 24, and the carrier 53 is mechanically engaged with the second drive shaft 62, thereby fixing rotation of the ring gear 52. The second deceleration mechanism 50 decelerates power from the second rotor 24 and transmits the resulting power to the second drive shaft 62. Assuming that the ratio of the number of teeth between the sun gear 51 and the ring gear 52 is ρ2 (0<ρ2<1), the deceleration ratio G2 of the second deceleration mechanism 50 (the transmission gear ratio on the second drive shaft 62 side, which is the transmission gear ratio from the second rotor 24 to the second drive shaft 62) is expressed as (1+ρ2)/ρ2. Here, ρ2=ρ1, and G2=G1. The second drive shaft 62 is mechanically engaged with the other one of the left driving wheel 63 and the right driving wheel 64 of the vehicle (in the example of FIG. 1, the right driving wheel 64), and rotates integrally with the right driving wheel 64 at the same rotational speed. By applying a torque to the second rotor 24 in the same direction as the rotational direction of the second rotor 24, it is possible to apply a driving torque to the right driving wheel 64 (second drive shaft 62). Meanwhile, by applying a torque to the second rotor 24 in the direction opposite to the rotational direction of the second rotor 24, it is possible to apply a braking torque to the right driving wheel 64 (second drive shaft 62).

The rechargeable power storage device 32 provided as a DC power supply can be composed of, for example, a secondary battery, and stores electrical energy. A shared inverter (shared power conversion system) 30 can be implemented with a known structure having a switching element and a diode (rectifier) connected to the switching element in reverse parallel, and by switching operation of the switching element, it is possible to convert DC power from the power storage device 32 to alternating current (three-phase alternating current) and supply the resulting current to each phase of the stator windings 13 and 23 of the first and second induction machines 10 and 20. Further, the shared inverter 30 can perform power conversion in the direction to convert alternating current flowing through each phase of the stator windings 13 and 23 of the first and second induction machines 10 and 20 to direct current and collect electrical energy in the power storage device 32. As such, the shared inverter 30 can perform bidirectional power conversion between the power storage device 32 and the stator windings 13 and 23 of the first and second induction machines 10 and 20. The switching operation of the shared inverter 30 is controlled by an electronic control unit (ECU) 70.

Because, in the first induction machine 10, slipping changes according to the frequency of alternating current flowing through the stator winding 13 (power supply frequency), thereby changing the torque of the first rotor 14, it is possible to control the torque of the first rotor 14, for example, by controlling the frequency of alternating current of the stator winding 13 based on the rotational speed of the first rotor 14. Likewise, because, in the second induction machine 20, slipping also changes according to the frequency of alternating current flowing through the stator winding 23 (power supply frequency), thereby changing the torque of the second rotor 24, it is possible to control the torque of the second rotor 24, for example, by controlling the frequency of alternating current of the stator winding 23 based on the rotational speed of the second rotor 24. When the rotational speed is equal between the left driving wheel 63 (first drive shaft 61) and the right driving wheel 64 (second drive shaft 62), such as when the vehicle is traveling straight; that is, when the rotational speed is equal between the first rotor 14 and the second rotor 24, the first induction machine 10 and the second induction machine 20 have equal sync frequency. In this case, if common alternating currents of the same frequency are fed to the stator windings 13 and 23, slipping becomes equal between the first induction machine 10 and the second induction machine 20, and torque becomes equal between the first rotor 14 and the second rotor 24, thereby equalizing torque distribution to the left driving wheel 63 and the right driving wheel 64. At this time, if the frequency of the common alternating currents to be fed to the stator windings 13 and 23 (power supply frequency) is changed, the torques of the first and second rotors 14 and 24 change, thereby changing a total torque of the left driving wheel 63 and the right driving wheel 64. In addition, if the amplitude of the common alternating currents to be fed to the stator windings 13 and 23 is changed, the torques of the first and second rotors 14 and 24 change, thereby changing the total torque of the left driving wheel 63 and the right driving wheel 64.

Figure 2:
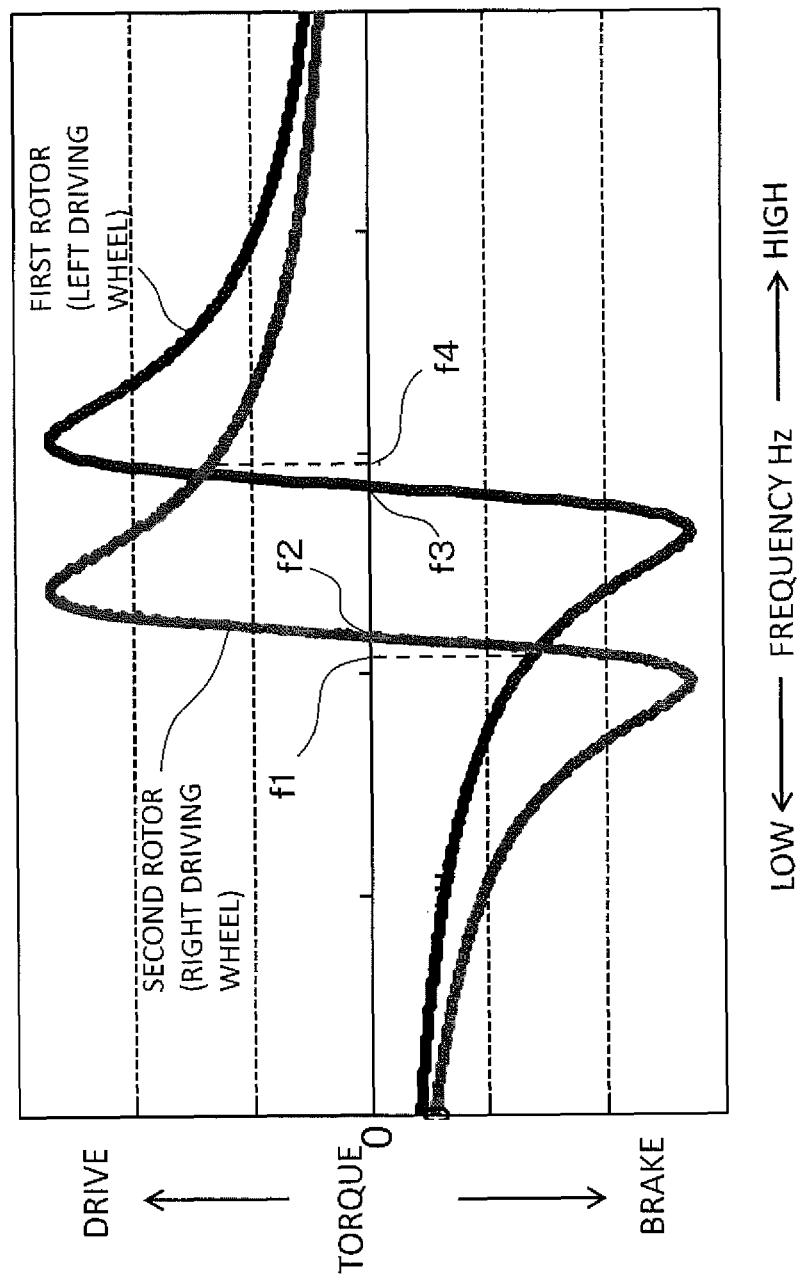
FIG. 2 shows an example of torque characteristics with respect to the power supply frequency when a rotational difference is generated between a first rotor and a second rotor.

Meanwhile, when a rotational difference is generated between the left driving wheel 63 (first drive shaft 61) and the right driving wheel 64 (second drive shaft 62), such as when the vehicle is turning; that is, when a rotational difference is generated between the first rotor 14 and the second rotor 24, the first induction machine 10 and the second induction machine 20 have different sync frequencies. In this case, even if the frequency of alternating current (power supply frequency) is equal between the stator winding 13 and the stator winding 23, slipping differs between the first induction machine 10 and the second induction machine 20. In this case, for example, as shown in FIG. 2, the first rotor 14 and the second rotor 24 have different torque characteristics with respect to the power supply frequency. In the example of FIG. 2, regarding the torques, assuming that the same direction as the rotational direction is the driving side, and that the direction opposite to the rotational direction is the braking side, if the rotational speed of the first rotor 14 is higher than the rotational speed of the second rotor 24, the sync frequency f3 of the first induction machine 10 becomes higher than the sync frequency f2 of the second induction machine 20, and the power supply frequency corresponding to the peak of the torque of the first rotor 14 becomes higher than the power supply frequency corresponding to the peak of the torque of the second rotor 24.

Therefore, if, for example, as shown in FIG. 2, a rotational difference is generated between the first rotor 14 and the second rotor 24, a difference in torques corresponding to the same frequency is generated between the first rotor 14 and the second rotor 24 even if the common alternating currents of the same frequency are fed to the stator windings 13 and 23, and thus, a torque difference is generated between the left driving wheel 63 and the right driving wheel 64. At this time, if the frequency of the common alternating currents (power supply frequency) to be fed to the stator windings 13 and 23 is changed, the difference in the torques corresponding to the same frequency changes between the first rotor 14 and the second rotor 24, thereby changing the torque difference between the left driving wheel 63 and the right driving wheel 64, and further changing the total torque of the left driving wheel 63 and the right driving wheel 64. Then, if the torque difference is generated between the first rotor 14 and the second rotor 24, and the amplitude of the common alternating currents to be fed to the stator windings 13 and 23 is changed, the torque characteristics of the first and second rotors 14 and 24 with respect to the power supply frequency change, respectively, thereby changing the torque difference between the left driving wheel 63 and the right driving wheel 64 and the total torque of the left driving wheel 63 and the right driving wheel 64.

In consideration of this, in the present embodiment, the single, shared inverter 30 is commonly used as a power conversion system (inverter) which performs switching operation to apply alternating current to the stator winding 13 of the first induction machine 10 and a power conversion system (inverter) which performs switching operation to apply alternating current to the stator winding 23 of the second induction machine 20. That is, by switching operation of the shared inverter 30, common alternating currents of the same frequency f0 are fed to the stator windings 13 and 23 of the first and second induction machines 10 and 20. Thus, when the rotational difference is generated between the first rotor 14 and the second rotor 24, such as, for example, when the vehicle is turning, by adjusting the torque difference between the first rotor 14 and the second rotor 24 in accordance with the frequency f0 of the common alternating currents to be fed to the stator windings 13 and 23 by the shared inverter 30, torque distribution to the left driving wheel 63 (first drive shaft 61) and the right driving wheel (second drive shaft 62) is adjusted. For example, in the case of FIG. 2 where the rotational speed of the first rotor 14 is higher than the rotational speed of the second rotor 24, by changing the frequency f0 of the alternating currents of the stator windings 13 and 23 in the range above f3, the distribution to a driving torque of the left driving wheel 63 and a driving torque of the right driving wheel 64 is changed. Meanwhile, by changing the frequency f0 of the alternating currents of the stator windings 13 and 23 in the range below f2, the distribution to a braking torque of the left driving wheel 63 and a braking torque of the right driving wheel 64 is changed. Further, by changing the frequency f0 of the alternating currents of the stator windings 13 and 23 in the range above f2 and below f3, the driving torque acts on the right driving wheel 64, and the braking torque acts on the left driving wheel 63, and the torque distribution to the left driving wheel 63 and the right driving wheel 64 is changed. Further, when the rotational difference and the torque difference are generated between the first rotor 14 and the second rotor 24, the total torque of the left driving wheel 63 (first drive shaft 61) and the right driving wheel 64 (second drive shaft 62) and the torque distribution to the left driving wheel 63 and the right driving wheel 64 are adjusted in accordance with the frequency f0 and the amplitude A0 of the common alternating currents to be fed to the stator windings 13 and 23 by the shared inverter 30.

The electronic control unit 70 receives, as inputs, the rotational speed Nr1 of the first rotor 14 detected by a rotational speed sensor 71, the rotational speed Nr2 of the second rotor 24 detected by a rotational speed sensor 72, the accelerator operation amount Ka detected by an accelerator operation amount sensor 73, the brake operation amount Kb detected by a brake operation amount sensor 74, the steering angle δ of steering wheels (for example, front wheels) 65 detected by a steering angle sensor 75, and the vehicle speed V detected by a vehicle speed sensor 76. The electronic control unit 70 controls switching operation of the shared inverter 30 based on, for example, a difference between the rotational speed Nr1 of the first rotor 14 and the rotational speed Nr2 of the second rotor 24, and controls the frequency f0 and the amplitude A0 of the common alternating currents to be fed to the stator windings 13 and 23, to thereby control the total torque of the first rotor 14 and the second rotor 24 and the torque difference between the first rotor 14 and the second rotor 24. Thus, the total torque of the left driving wheel 63 and the right driving wheel 64 and the torque distribution to the left driving wheel 63 and the right driving wheel 64 are adjusted.

Figure 3:
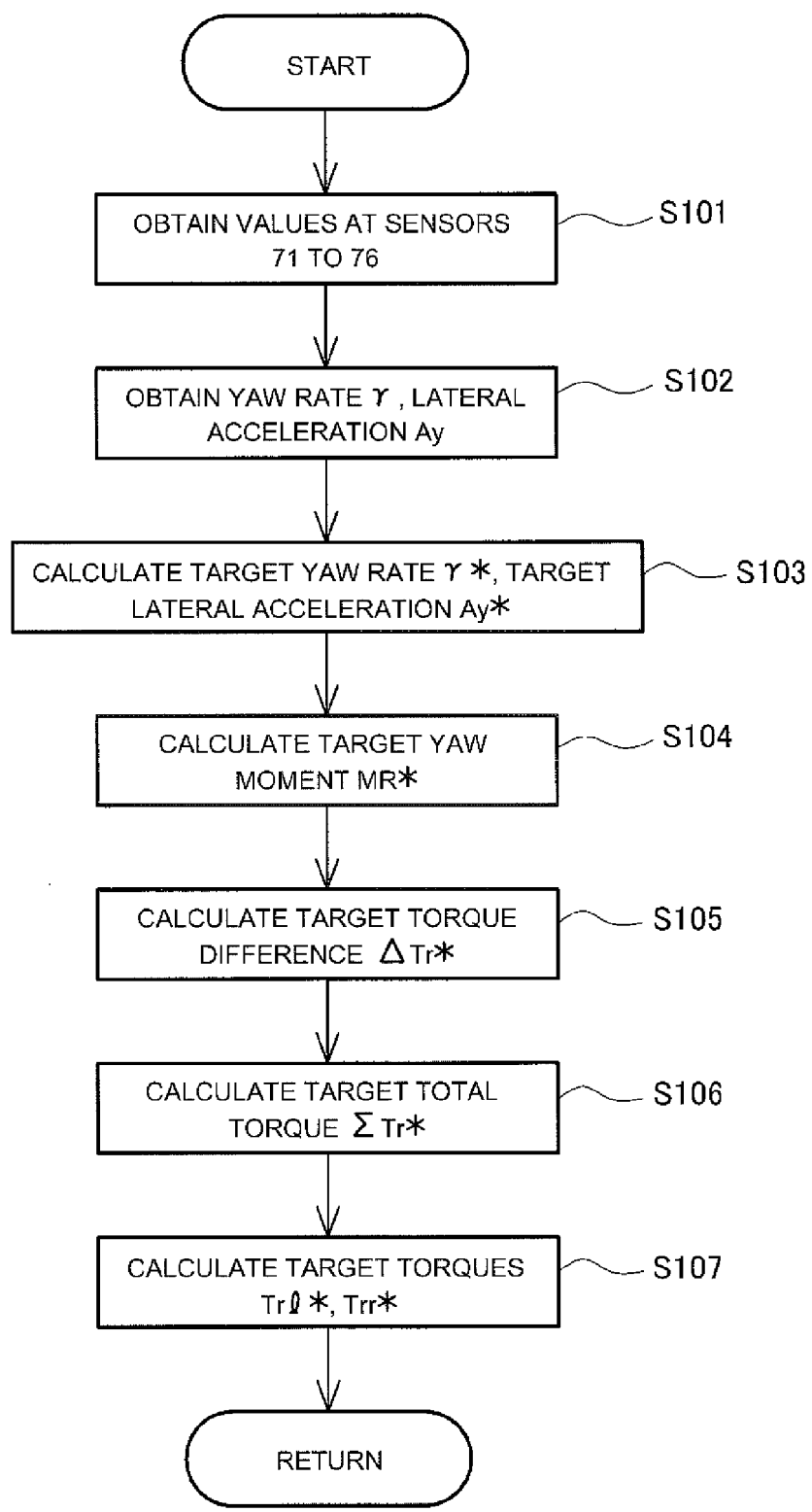
FIG. 3 shows a flowchart of an example of processing by an electronic control unit for controlling torque distribution to the left driving wheel and the right driving wheel while the vehicle is travelling.

FIG. 3 shows an example of processing for controlling the torque distribution to the left driving wheel 63 and the right driving wheel 64 by the electronic control unit 70 when the vehicle is travelling. The processing shown in the flowchart of FIG. 3 is performed repeatedly per predetermined time interval.

First, in step S101, values of the rotational speed Nr1 of the first rotor 14, the rotational speed Nr2 of the second rotor 24, the accelerator operation amount Ka, the brake operation amount Kb, the steering angle δ, and the vehicle speed V respectively detected by the sensors 71 to 76 are obtained. Next, in step S102, the yaw rate γ and the lateral acceleration Ay at the gravity center of the vehicle are obtained. Here, the yaw rate γ and the lateral acceleration Ay may be calculated according to known art such as, for example, Patent Document 3, or the yaw rate γ and the lateral acceleration Ay may be detected using a sensor. Next, in step S103, a target yaw rate γ* and a target lateral acceleration Ay* at the gravity center of the vehicle are calculated based on, for example, the values of the sensors 71 to 76, the yaw rate γ and the lateral acceleration Ay.

Next, in step S104, a target yaw moment Mr* which is applied around the gravity center of the vehicle by a torque difference between the driving wheels (for example, rear wheels) 63 and 64 is calculated. The target yaw moment Mr* in the same direction as the yaw rate γ is calculated if, during turning of the vehicle during which the rotational difference is generated between the left driving wheel 63 and the right driving wheel 64, for example, the lateral acceleration Ay is smaller than a setting, or the yaw rate γ is smaller than the target yaw rate γ*. Meanwhile, the target yaw moment Mr* in the direction opposite to the yaw rate γ is calculated if, during turning of the vehicle, for example, the lateral acceleration Ay is greater than the setting, or the yaw rate γ is greater than the target yaw rate γ*. Here, the setting can be changed in accordance with the steering angle δ and the vehicle speed V. In addition, during straight traveling of the vehicle during which the rotational difference is not generated between the left driving wheel 63 and the right driving wheel 64, the target yaw moment Mr* is set to be 0. Next, in step S105, a target torque difference ΔTr* between the left driving wheel 63 and the right driving wheel 64 is calculated from the target yaw moment Mr* calculated in step S104.

Next, in step S106, a target total torque ΣTr* of the left driving wheel 63 and the right driving wheel 64 is calculated based on the accelerator operation amount Ka and the brake operation amount Kb. For example, if the accelerator operation amount Ka is greater than 0, and the brake operation amount Kb is 0, the target total torque ΣTr* is set to be on the driving side (the same direction as the rotational direction of the driving wheels 63 and 64), and the target total torque ΣTr* increases on the driving side as the accelerator operation amount Ka increases. On the other hand, if the brake operation amount Kb is greater than 0, and the accelerator operation amount Ka is 0, the target total torque ΣTr* is set to be on the braking side (the direction opposite to the rotational direction of the driving wheels 63 and 64), and the target total torque ΣTr* increases on the braking side as the brake operation amount Kb increases.

Next, in step S107, a target torque Trl* of the left driving wheel 63 and a target torque Trr* of the right driving wheel 64 are calculated based on the target torque difference ΔTr* calculated in step S105 and the target total torque ΣTr* calculated in step S106. Subsequently, the frequency f0 and the amplitude A0 of alternating current are calculated based on, for example, a difference between the rotational speed Nr1 of the first rotor 14 and the rotational speed Nr2 of the second rotor 24 such that the torque of the left driving wheel 63 becomes the target torque Trl* and the torque of the right driving wheel 64 becomes the target torque Trr*. Then, by controlling switching operation of the shared invertor 30 so as to feed alternating current having the frequency 0 and the amplitude A0 to the stator windings 13 and 23, the torque of the first rotor 14 and the torque of the second rotor 24 are controlled.

Figure 4:
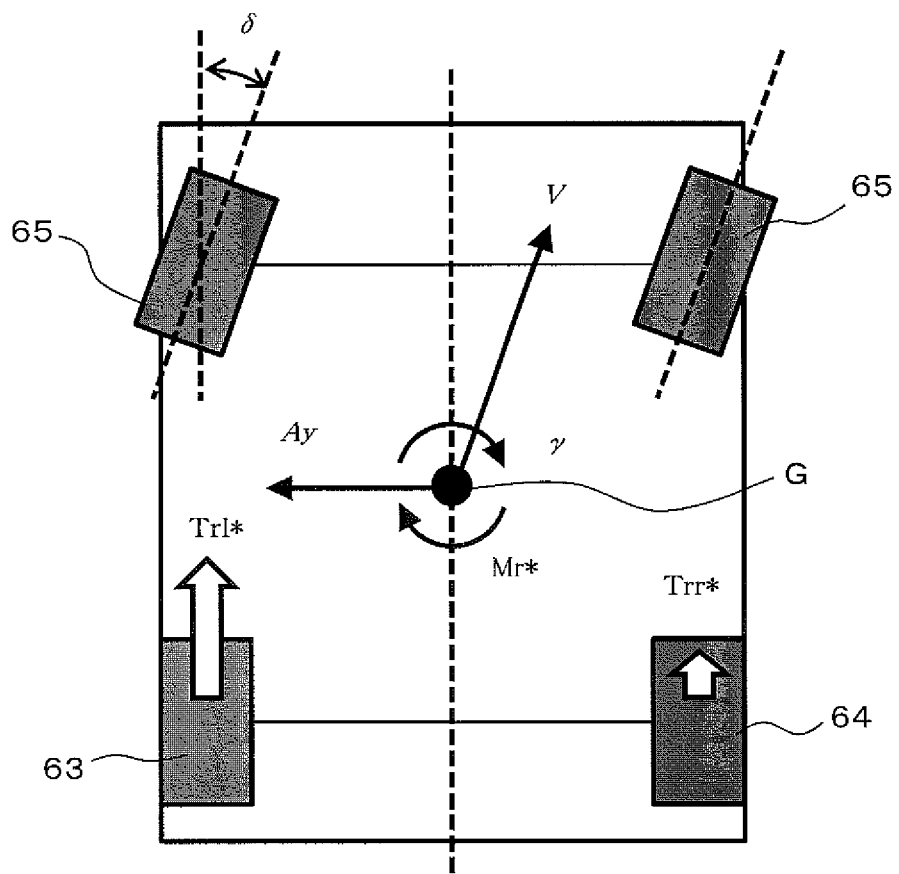
FIG. 4 shows a diagram of an example of a target torque Trl* of the left driving wheel and a target torque Trr* of the right driving wheel when a yaw rate γ and a target yaw moment Mr* are in the same direction.

If, during turning of the vehicle, the target total torque ΣTr* is on the driving side, the target torque Trl* of the left driving wheel 63 and the target torque Trr* of the right driving wheel 64 are both set to the driving side, for example. In this case, if, as shown in FIG. 4, the yaw rate γ and the target yaw moment Mr* at the gravity center G of the vehicle are in the same direction such as, for example, in the right turning direction, the target torque Trl* on the driving side of the left driving wheel 63 having a higher rotational speed becomes greater than the target torque Trr* on the driving side of the right driving wheel 64 having a lower rotational speed. The frequency f0 of alternating current is set to be in the range where the driving torque of the first rotor 14 having the higher rotational speed becomes greater than the driving torque of the second rotor 24 having the lower rotational speed, and in the example of FIG. 2, it is set to be in the range above f4. Moreover, the amplitude A0 of alternating current is set such that the total torque of the left driving wheel 63 and the right driving wheel 64 becomes the target total torque ΣTr*.

Figure 5:
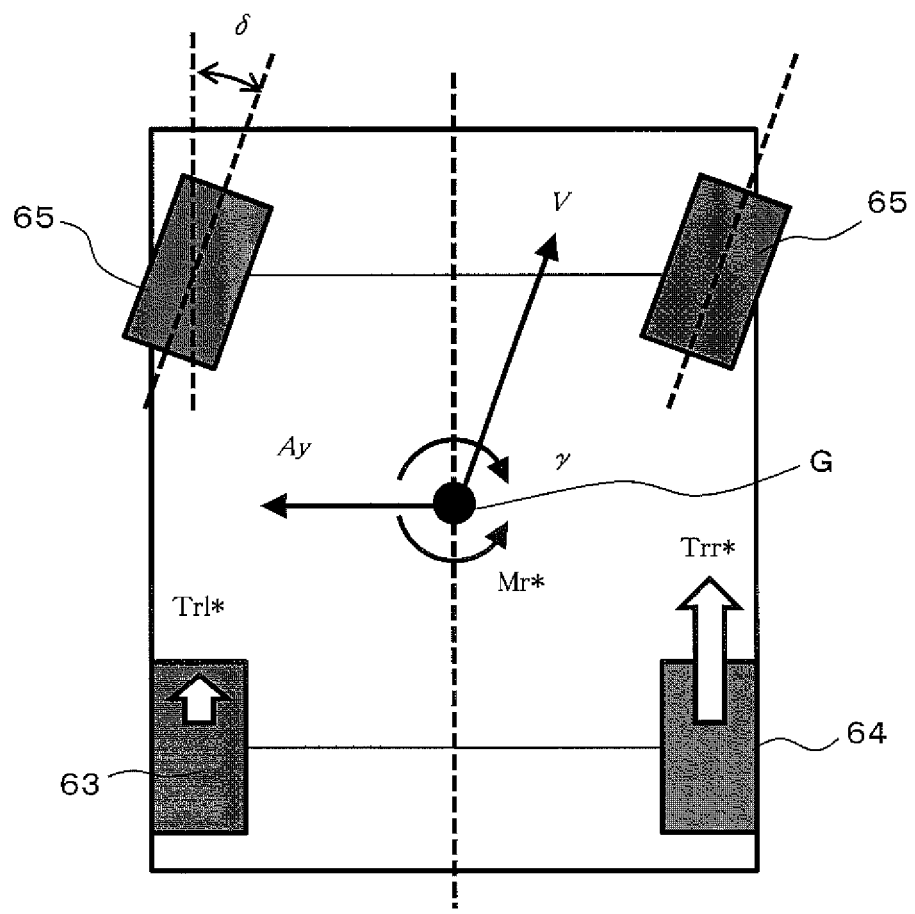
FIG. 5 shows a diagram of an example of a target torque Trl* of the left driving wheel and a target torque Trr* of the right driving wheel when the yaw rate γ and the target yaw moment Mr* are in opposite directions.

Meanwhile, if, as shown in FIG. 5, the target yaw moment Mr* at the gravity center G of the vehicle is, for example, in the left turning direction, which is the direction opposite to the yaw rate γ in the right turning direction, the target torque Trl* on the driving side of the left driving wheel 63 having the higher rotational speed becomes smaller than the target torque Trr* on the driving side of the right driving wheel 64 having the lower rotational speed. The frequency f0 of alternating current is set to be in the range where the driving torque of the first rotor 14 having the higher rotational speed becomes smaller than the driving torque of the second rotor 24 having the lower rotational speed, and in the example of FIG. 2, it is set to be in the range above f3 and below f4. Moreover, the amplitude A0 of alternating current is set such that the total torque of the left driving wheel 63 and the right driving wheel 64 becomes the target total torque ΣTr*.

Figure 6:
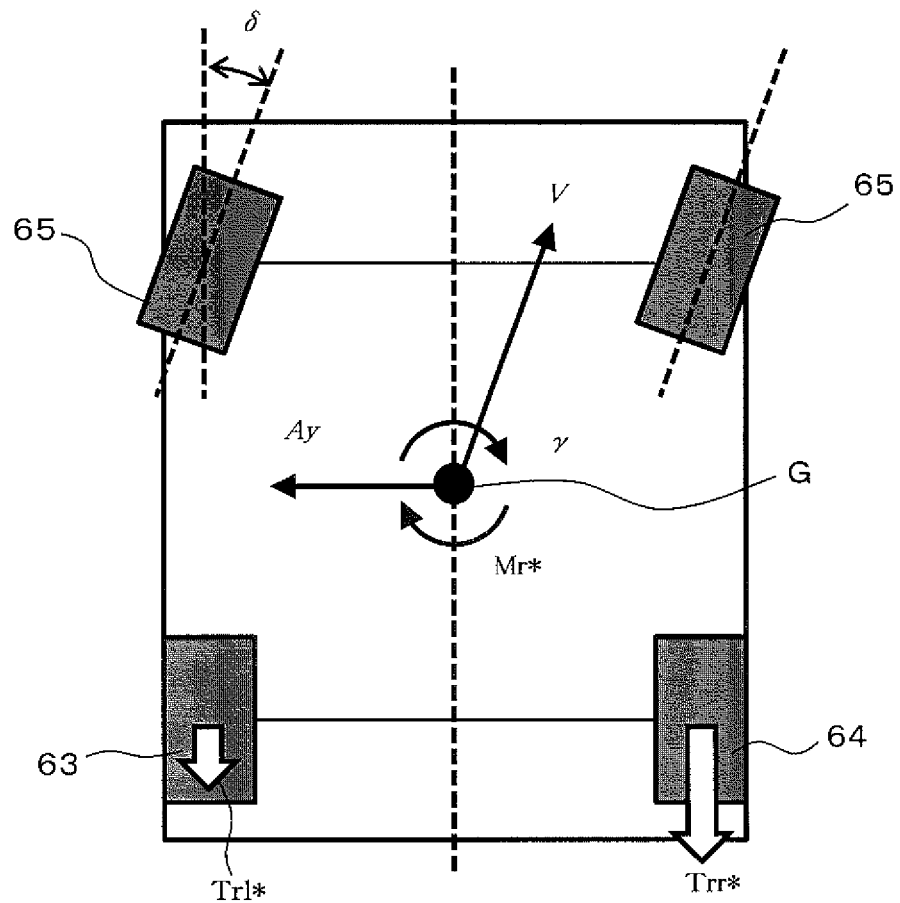
FIG. 6 shows a diagram of an example of a target torque Trl* of the left driving wheel and a target torque Trr* of the right driving wheel when the yaw rate γ and the target yaw moment Mr* are in the same direction.

In addition, if, during turning of the vehicle, the target total torque ΣTr* is on the braking side, the target torque Trl* of the left driving wheel 63 and the target torque Trr* of the right driving wheel 64 are both set to the braking side, for example. In this case, if, as shown in FIG. 6, the yaw rate γ and the target yaw moment Mr* at the gravity center G of the vehicle are in the same direction such as, for example, in the right turning direction, the target torque Trl* on the braking side of the left driving wheel 63 having the higher rotational speed becomes smaller than the target torque Trr* on the braking side of the right driving wheel 64 having the lower rotational speed. The frequency f0 of alternating current is set to be in the range where the braking torque of the first rotor 14 having the higher rotational speed becomes smaller than the braking torque of the second rotor 24 having the lower rotational speed, and in the example of FIG. 2, it is set to be in the range below f1. Moreover, the amplitude A0 of alternating current is set such that the total torque of the left driving wheel 63 and the right driving wheel 64 becomes the target total torque ΣTr*.

Figure 7:
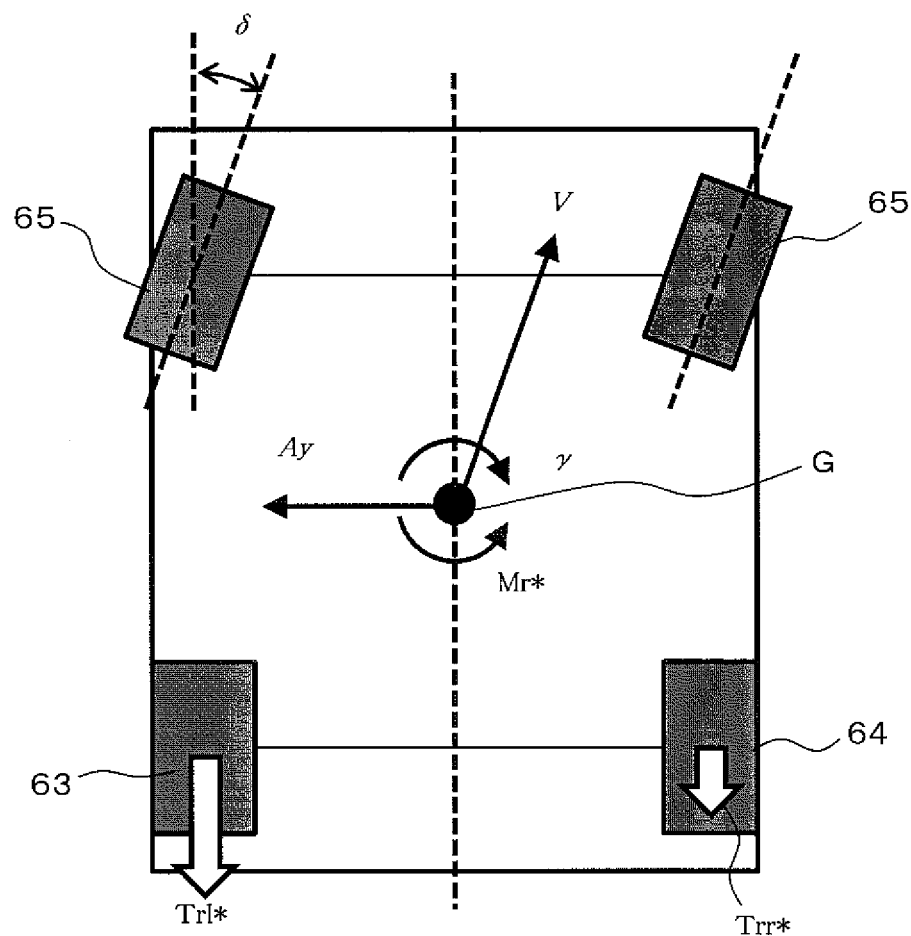
FIG. 7 shows a diagram of an example of a target torque Trl* of the left driving wheel and a target torque Trr* of the right driving wheel when the yaw rate γ and the target yaw moment Mr* are in opposite directions.

Meanwhile, if, as shown in FIG. 7, the target yaw moment Mr* at the gravity center G of the vehicle is, for example, in the left turning direction, which is the direction opposite to the yaw rate γ in the right turning direction, the target torque Trl* on the braking side of the left driving wheel 63 having the higher rotational speed becomes greater than the target torque Trr* on the braking side of the right driving wheel 64 having the lower rotational speed. The frequency f0 of alternating current is set to be in the range where the braking torque of the first rotor 14 having the higher rotational speed becomes greater than the braking torque of the second rotor 24 having the lower rotational speed, and in the example of FIG. 2, it is set to be in the range above f1 and below f2. Moreover, the amplitude A0 of alternating current is set such that the total torque of the left driving wheel 63 and the right driving wheel 64 becomes the target total torque ΣTr*.

Figure 8:
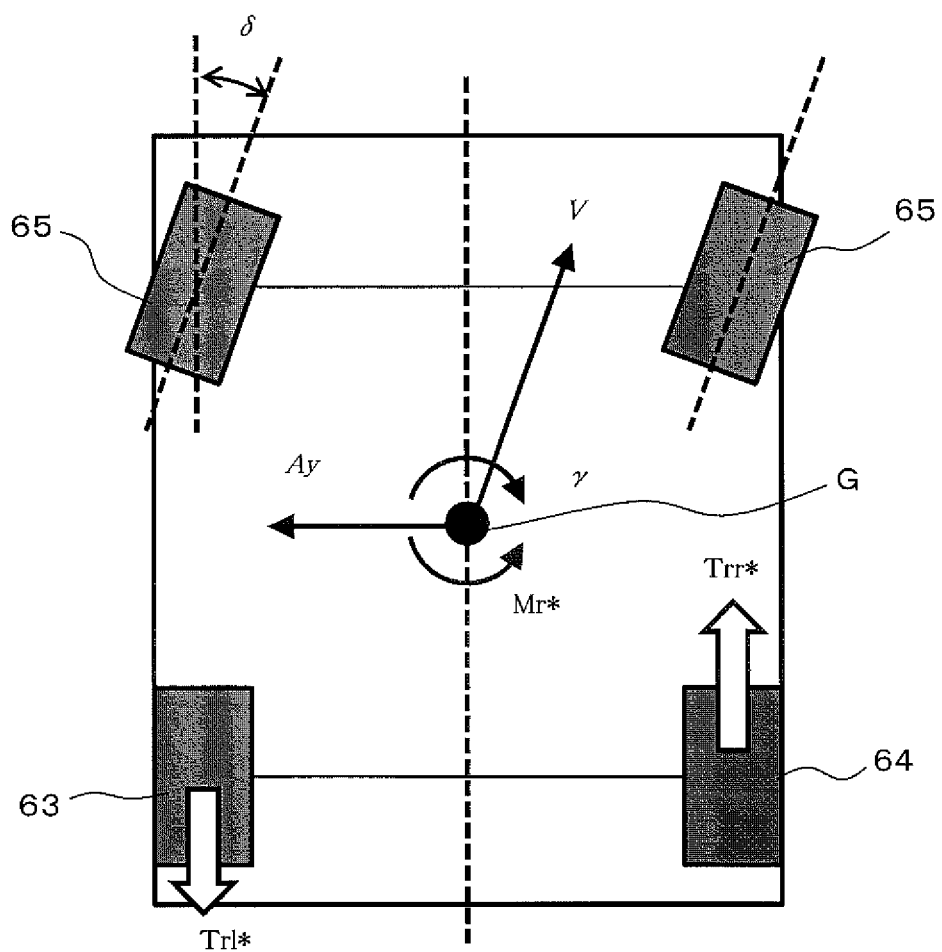
FIG. 8 shows a diagram of an example of a target torque Trl* of the left driving wheel and a target torque Trr* of the right driving wheel when the yaw rate γ and the target yaw moment Mr* are in opposite directions.

However, if, as shown in FIG. 8, the target yaw moment Mr* at the gravity center G of the vehicle is, for example, in the left turning direction, which is the direction opposite to the yaw rate γ in the right turning direction, it is also possible to set the target torque Trl* of the left driving wheel 63 having the higher rotational speed to the braking side, and set the target torque Trr* of the right driving wheel 64 having the lower rotational speed to the driving side. At this time, if the target total torque ΣTr* is on the driving side, the target torque Trr* on the driving side of the right driving wheel 64 becomes greater than the target torque Trl* on the braking side of the left driving wheel 63. Of the range above f2 and below f3 in the example of FIG. 2, the frequency f0 of alternating current is set to be in the range where the driving torque of the second rotor 24 having the lower rotational speed becomes greater than the braking torque of the first rotor 14 having the higher rotational speed. Moreover, the amplitude A0 of alternating current is set such that the total torque of the left driving wheel 63 and the right driving wheel 64 becomes the target total torque ΣTr*. Meanwhile, if the target total torque ΣTr* is on the braking side, the target torque Trl* on the braking side of the left driving wheel 63 becomes greater than the target torque Trr* on the driving side of the right driving wheel 64. Of the range above f2 and below f3 in the example of FIG. 2, the frequency f0 of alternating current is set to be in the range where the braking torque of the first rotor 14 having the higher rotational speed becomes greater than the driving torque of the second rotor 24 having the lower rotational speed. Moreover, the amplitude A0 of alternating current is set such that the total torque of the left driving wheel 63 and the right driving wheel 64 becomes the target total torque ΣTr*.

Also, when the target yaw moment Mr* is 0, such as, for example, when the vehicle is traveling straight, the target torque difference ΔTr* between the left driving wheel 63 and the right driving wheel 64 is set to be 0. That is, the target torque Trl* of the left driving wheel 63 and the target torque Trr* of the right driving wheel 64 are set to be equal.

According to the above-described present embodiment, when the rotational difference is generated between the left driving wheel 63 and the right driving wheel 64, such as, for example, when the vehicle is turning, by controlling the frequency f0 of the common alternating currents to be fed to the stator windings 13 and 23 of the first and the second induction machines 10 and 20 by the shared inverter 30, it is possible to control the torque difference between the first rotor 14 and the second rotor 24 and control the torque distribution to the left driving wheel 63 and the right driving wheel 64. Further, by controlling the amplitude A0 of the common alternating currents to be fed to the stator windings 13 and 23 by the shared inverter 30, it is possible to control the total torque of the first rotor 14 and the second rotor 24 and control the total torque of the left driving wheel 63 and the right driving wheel 64. Therefore, switching operation for controlling alternating current of the stator winding 13 and switching operation for controlling alternating current of the stator winding 23 do not have to be carried out independently in separate inverters, but can be performed in the single, shared inverter 30 in a simplified manner. As a result, the structure of the driving power distribution device for controlling the torque distribution to the left driving wheel 63 and the right driving wheel 64 is simplified, thereby achieving miniaturization and cost reduction.

For example, if, during turning of the vehicle, the yaw rate γ and the target yaw moment Mr* are in the same direction, the turning performance of the vehicle can be improved by controlling the frequency f0 of the common alternating currents to be fed to the stator windings 13 and 23 such that the driving torque of the driving wheel having the higher rotational speed becomes greater than the driving torque of the driving wheel having the lower rotational speed, or such that the braking torque of the driving wheel having the higher rotational speed becomes smaller than the braking torque of the driving wheel having the lower rotational speed.

Meanwhile, if, during turning of the vehicle, the yaw rate γ and the target yaw moment Mr* are in opposite directions, the travelling stability of the vehicle can be improved by controlling the frequency f0 of the common alternating currents to be fed to the stator windings 13 and 23 such that the driving torque of the driving wheel having the higher rotational speed becomes smaller than the driving torque of the driving wheel having the lower rotational speed, or such that the braking torque of the driving wheel having the higher rotational speed becomes greater than the braking torque of the driving wheel having the lower rotational speed. Further, in this case, the frequency f0 of the common alternating currents to be fed to the stator windings 13 and 23 can be controlled so as to apply a braking torque to the driving wheel having the higher rotational speed and apply a driving torque to the driving wheel having the lower rotational speed. Thus, it is possible to increase the yaw moment for suppressing the yaw rate γ and further improve the turning performance of the vehicle.

In the above description, the numbers of poles in the first induction machine 10 and the second induction machine 20 are assumed to be equal. However, in the present embodiment, a difference in the number of poles between the first induction machine 10 and the second induction machine 20 can be changed by changing any one or more of the number of poles in the first induction machine 10 and the number of poles in the second induction machine 20. The electronic control unit 70 controls the difference in the number of poles between the first induction machine 10 and the second induction machine 20. As for a specific structure example for changing the number of poles in the induction machines, detailed description will be omitted, because such a structure example can be implemented using known technique such as that described in Document (Takayuki Mizuno at al., "Basic Principle and Maximum Torque Characteristics of A Six— Phase Pole Change Induction Motor for Electric Vehicles", T. IEE Japan, Vol. 116-D, No. 3, 1996, p. 256-264).

Figure 9:
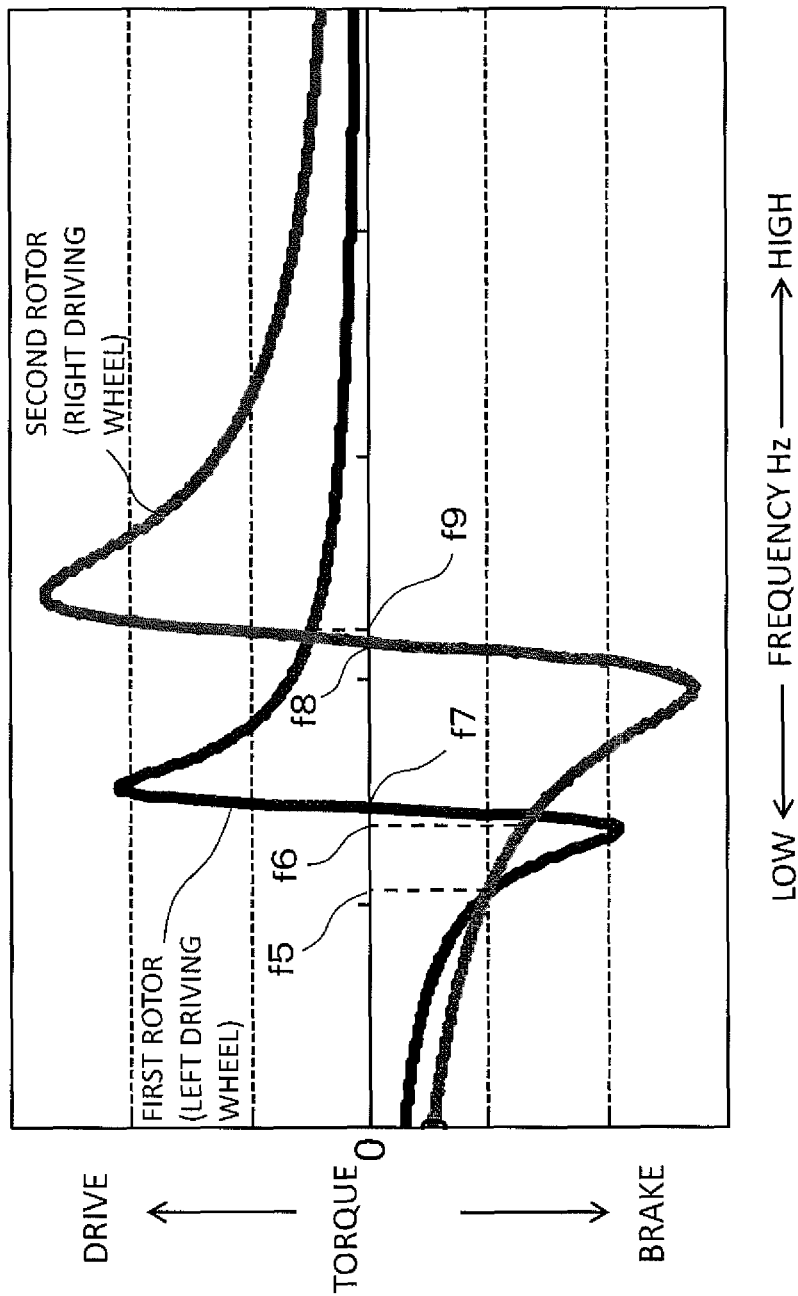
FIG. 9 shows a diagram of an example of torque characteristics with respect to the power supply frequency when a difference in the number of poles is generated between a first induction machine and a second induction machine.

When a difference in the number of poles is generated between the first induction machine 10 and the second induction machine 20, the first induction machine 10 and the second induction machine 20 have different sync frequencies, for example, as shown in FIG. 9, and the first rotor 14 and the second rotor 24 have different torque characteristics with respect to the power supply frequency. The example in FIG. 9 shows the torque characteristics obtained when the first induction machine 10 has a smaller number of poles than the second induction machine 20 and when the rotational speed of the first rotor 14 is higher than that of the second rotor 24. The sync frequency f7 of the first induction machine 10 becomes lower than the sync frequency f8 of the second induction machine 20, and the power supply frequency corresponding to the peak of the torque of the first rotor 14 becomes lower than the power supply frequency corresponding to the peak of the torque of the second rotor 24.

Therefore, if, for example, as shown in FIG. 9, the difference in the number of poles is generated between the first induction machine 10 and the second induction machine 20, a difference in torques corresponding to the same frequency is generated between the first rotor 14 and the second rotor 24, even if the common alternating currents of the same frequency are fed to the stator windings 13 and 23, and thus, a torque difference is generated between the left driving wheel 63 and the right driving wheel 64. At this time, if the difference in the number of poles between the first induction machine 10 and the second induction machine 20 is changed, the difference in torques corresponding to the same frequency between the first rotor 14 and the second rotor 24 is changed, thereby changing the torque difference between the left driving wheel 63 and the right driving wheel 64 and further changing the total torque of the left driving wheel 63 and the right driving wheel 64. Therefore, the torque difference between the first rotor 14 and the second rotor 24 can be adjusted in accordance with the frequency f0 of the common alternating currents to be fed to the stator windings 13 and 23 by the shared inverter 30 and the difference in the number of poles between the first induction machine 10 and the second induction machine 20, thereby adjusting the torque distribution to the left driving wheel 63 (first drive shaft 61) and the right driving wheel 64 (second drive shaft 62). In the example of FIG. 9, by changing the frequency f0 of the alternating currents of the stator windings 13 and 23 in the range above f8, the distribution to the driving torque of the left driving wheel 63 and the driving torque of the right driving wheel 64 is changed. Meanwhile, by changing the frequency f0 of the alternating currents of the stator windings 13 and 23 in the range below f7, the distribution to the braking torque of the left driving wheel 63 and the braking torque of the right driving wheel 64 is changed. Further, by changing the frequency f0 of the alternating currents of the stator windings 13 and 23 in the range above f7 and below f8, the driving torque acts on the left driving wheel 63, and the braking torque acts on the right driving wheel 64, and the torque distribution to the left driving wheel 63 and the right driving wheel 64 is changed.

In the structure example where the difference in the number of poles between the first induction machine 10 and the second induction machine 20 can be changed, if, during turning of the vehicle, the accelerator operation amount Ka is large, and the target total torque $\Sigma Tr^*$ on the driving side is large with respect to the target torque difference $\Delta Tr^*$, the target torque Trl* of the left driving wheel 63 and the target torque Trr* of the right driving wheel 64 are both set to the driving side. In this case, if, as shown in FIG. 4, the yaw rate $\gamma$ and the target yaw moment Mr* are in the same direction, and the target torque Trl* on the driving side of the left driving wheel 63 having the higher rotational speed becomes greater than the target torque Trr* on the driving side of the right driving wheel 64 having the lower rotational speed, by increasing the number of poles of the first induction machine 10 or reducing the number of poles of the second induction machine 20, the difference in the number of poles between the first induction machine 10 and the second induction machine 20 is changed such that the number of poles of the first induction machine 10 becomes greater than the number of poles of the second induction machine 20. Alternatively, the first induction machine 10 and the second induction machine 20 are allowed to have equal numbers of poles. The frequency f0 of alternating current is set to be in the range where the driving torque of the first rotor 14 having the higher rotational speed becomes greater than the driving torque of the second rotor 24 having the lower rotational speed, and in the example of FIG. 2, it is set to be in the range above f4. Thus, the degree of freedom for controlling the frequency f0 of alternating current is enhanced, and the turning performance of the vehicle is improved. Moreover, the amplitude A0 of alternating current is set such that the total torque of the left driving wheel 63 and the right driving wheel 64 becomes the target total torque $\Sigma Tr^*$.

Meanwhile, if, for example, as shown in FIG. 5, the yaw rate $\gamma$ and the target yaw moment Mr* are in opposite directions, and the target torque Trl* on the driving side of the left driving wheel 63 having the higher rotational speed becomes smaller than the target torque Trr* on the driving side of the right driving wheel 64 having the lower rotational speed, by reducing the number of poles of the first induction machine 10 or increasing the number of poles of the second induction machine 20, the difference in the number of poles between the first induction machine 10 and the second induction machine 20 is changed such that the number of poles of the first induction machine 10 becomes smaller than the number of poles of the second induction machine 20. The frequency f0 of alternating current is set to be in the range where the driving torque of the first rotor 14 having the higher rotational speed becomes smaller than the driving torque of the second rotor 24 having the lower rotational speed, and in the example of FIG. 9, it is set to be in the range above f9. Thus, the degree of freedom for controlling the frequency f0 of alternating current is enhanced, and the traveling stability of the vehicle is improved. Moreover, the amplitude A0 of alternating current is set such that the total torque of the left driving wheel 63 and the right driving wheel 64 becomes the target total torque $\Sigma Tr^*$.

Further, if, during turning of the vehicle, the brake operation amount Kb is large, and the target total torque $\Sigma Tr^*$ on the braking side is large with respect to the target torque difference $\Delta Tr^*$, the target torque Trl* of the left driving wheel 63 and the target torque Trr* of the right driving wheel 64 are both set to the braking side. In this case, if, as shown in FIG. 6, the yaw rate $\gamma$ and the target yaw moment Mr* are in the same direction, and the target torque Trl* on the braking side of the left driving wheel 63 having the higher rotational speed becomes smaller than the target torque Trr* on the braking side of the right driving wheel 64 having the lower rotational speed, the difference in the number of poles between the first induction machine 10 and the second induction machine 20 is changed such that the number of poles of the first induction machine 10 becomes greater than the number of poles of the second induction machine 20. Alternatively, the first induction machine 10 and the second induction machine 20 are allowed to have equal numbers of poles. The frequency f0 of alternating current is set to be in the range where the braking torque of the first rotor 14 having the higher rotational speed becomes smaller than the braking torque of the second rotor 24 having the lower rotational speed, and in the example of FIG. 2, it is set to be in the range below f1. Thus, the degree of freedom for controlling the frequency f0 of alternating current is enhanced, and the turning performance of the vehicle is improved. Moreover, the amplitude A0 of alternating current is set such that the total torque of the left driving wheel 63 and the right driving wheel 64 becomes the target total torque $\Sigma Tr^*$.

Meanwhile, if, for example, as shown in FIG. 7, the yaw rate $\gamma$ and the target yaw moment Mr* are in opposite directions, and the target torque Trl* on the braking side of the left driving wheel 63 having the higher rotational speed becomes greater than the target torque Trr* on the braking side of the right driving wheel 64 having the lower rotational speed, the difference in the number of poles between the first induction machine 10 and the second induction machine 20 is changed such that the number of poles of the first induction machine 10 becomes smaller than the number of poles of the second induction machine 20. The frequency f0 of alternating current is set to be in the range where the braking torque of the first rotor 14 having the higher rotational speed becomes greater than the braking torque of the second rotor 24 having the lower rotational speed, and in the example of FIG. 9, it is set to be in the range above f5 and below f6. Thus, the degree of freedom for controlling the frequency f0 of alternating current is enhanced, and the traveling stability of the vehicle is improved. Moreover, the amplitude A0 of alternating current is set such that the total torque of the left driving wheel 63 and the right driving wheel 64 becomes the target total torque $\Sigma Tr^*$.

Figure 10:
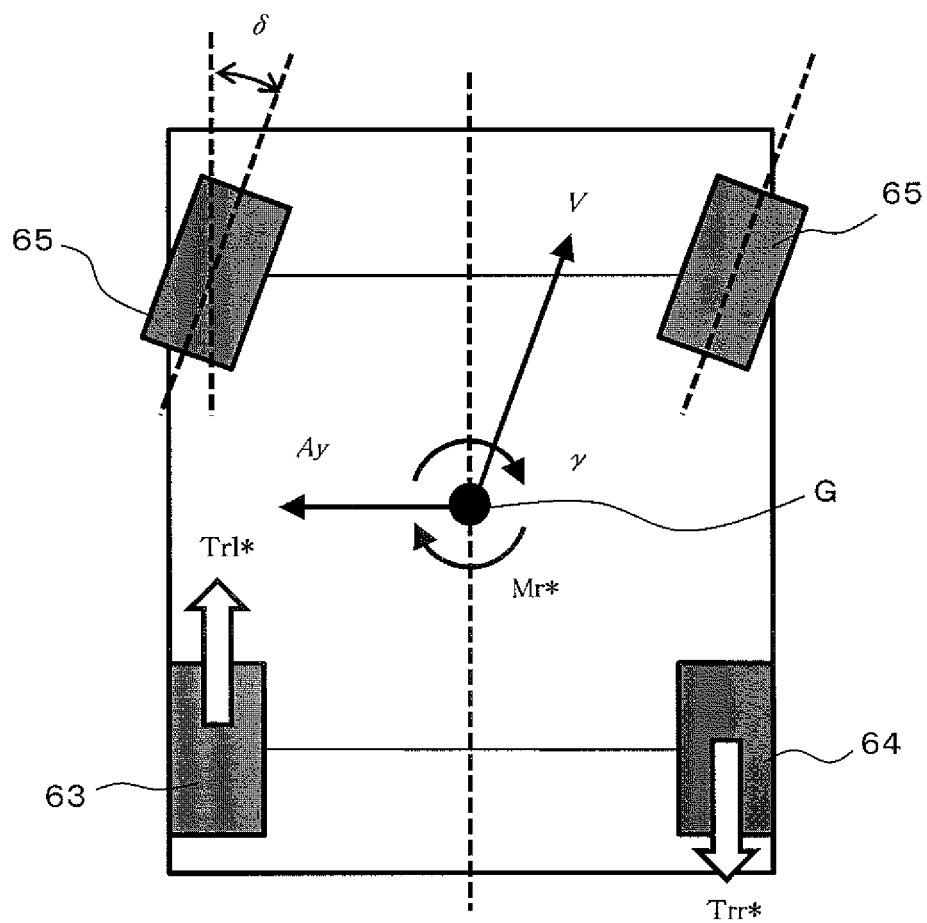
FIG. 10 shows a diagram of an example of a target torque Trl* of the left driving wheel and a target torque Trr* of the right driving wheel when the yaw rate γ and the target yaw moment Mr* are in the same direction.

Further, if, during turning of the vehicle, the accelerator operation amount Ka and the brake operation amount Kb are small, and the target total torque $\Sigma Tr^*$ is small with respect to the target torque difference $\Delta Tr^*$, one of the target torque Trl* of the left driving wheel 63 and the target torque Trr* of the right driving wheel 64 is set to the driving side, and the other one is set to the braking side. In this case, if, as shown in FIG. 10, the yaw rate $\gamma$ and the target yaw moment Mr* at the gravity center G of the vehicle are in the same direction such as, for example, in the right turning direction, the target torque Trl* of the left driving wheel 63 having the higher rotational speed is set to the driving side, and the target torque Trr* of the right driving wheel 64 having the lower rotational speed is set to the braking side. In this case, the difference in the number of poles between the first induction machine 10 and the second induction machine 20 is changed such that the number of poles of the first induction machine 10 becomes smaller than the number of poles of the second induction machine 20. The frequency f0 of alternating current is set to be in the range where the driving torque acts on the first rotor 14 having the higher rotational speed and the braking torque acts on the second rotor 24 having the lower rotational speed, and in the example of FIG. 9, it is set to be in the range above f7 and below f8. Thus, it is possible to enhance the degree of freedom for controlling the frequency f0 of alternating current and increase the yaw moment in the same direction as the yaw rate γ, thereby further improving the turning performance of the vehicle. Moreover, the amplitude A0 of alternating current is set such that the total torque of the left driving wheel 63 and the right driving wheel 64 becomes the target total torque ΣTr*. As such, when the frequency f0 of alternating current is adjusted so as to apply the driving torque to, of the first and second induction machines 10 and 20, the induction machine having the higher rotational speed, and apply the braking torque to the induction machine having the lower rotational speed, the number of poles of the induction machine having the higher rotational speed is made smaller than the number of poles of the induction machine having the lower rotational speed.

Meanwhile, if, for example, as shown in FIG. 8, the yaw rate γ and the target yaw moment Mr* are in opposite directions, the target torque Trl* of the left driving wheel 63 having the higher rotational speed is set to the braking side, and the target torque Trr* of the right driving wheel 64 having the lower rotational speed is set to the driving side. In this case, the difference in the number of poles between the first induction machine 10 and the second induction machine 20 is changed such that the number of poles of the first induction machine 10 becomes greater than the number of poles of the second induction machine 20. Alternatively, the first induction machine 10 and the second induction machine 20 are allowed to have equal numbers of poles. The frequency f0 of alternating current is set to be in the range where the braking torque acts on the first rotor 14 having the higher rotational speed and the driving torque acts on the second rotor 24 having the lower rotational speed, and in the example of FIG. 2, it is set to be in the range above f2 and below f3. Thus, it is possible to enhance the degree of freedom for controlling the frequency f0 of alternating current and increase the yaw moment in the direction opposite to the yaw rate γ, thereby further improving the traveling stability of the vehicle. Moreover, the amplitude A0 of alternating current is set such that the total torque of the left driving wheel 63 and the right driving wheel 64 becomes the target total torque ΣTr*. As such, when the frequency f0 of alternating current is adjusted so as to apply the braking torque to, of the first and second induction machines 10 and 20, the induction machine having the higher rotational speed and apply the driving torque to the induction machine having the lower rotational speed, the number of poles of the induction machine having the higher rotational speed is made equal to or greater than the number of poles of the induction machine having the lower rotational speed.

Also, if the target yaw moment Mr* is 0, such as, for example, when the vehicle is traveling straight, the target torque Trl* of the left driving wheel 63 and the target torque Trr* of the right driving wheel 64 are set to be equal. In this case, the first induction machine 10 and the second induction machine 20 are allowed to have equal numbers of poles.

In the above description, the deceleration ratio G1 of the first deceleration mechanism 40 (transmission gear ratio on the first drive shaft 61 side) is assumed to be equal to the deceleration ratio G2 of the second deceleration mechanism 50 (transmission gear ratio on the second drive shaft 62 side). However, in the present embodiment, the difference between the transmission gear ratio G1 on the first drive shaft 61 side and the transmission gear ratio G2 on the second drive shaft 62 side can be changed by changing one or more of the transmission gear ratio G1 on the first drive shaft 61 side and the transmission gear ratio G2 on the second drive shaft 62 side.

Figure 11:
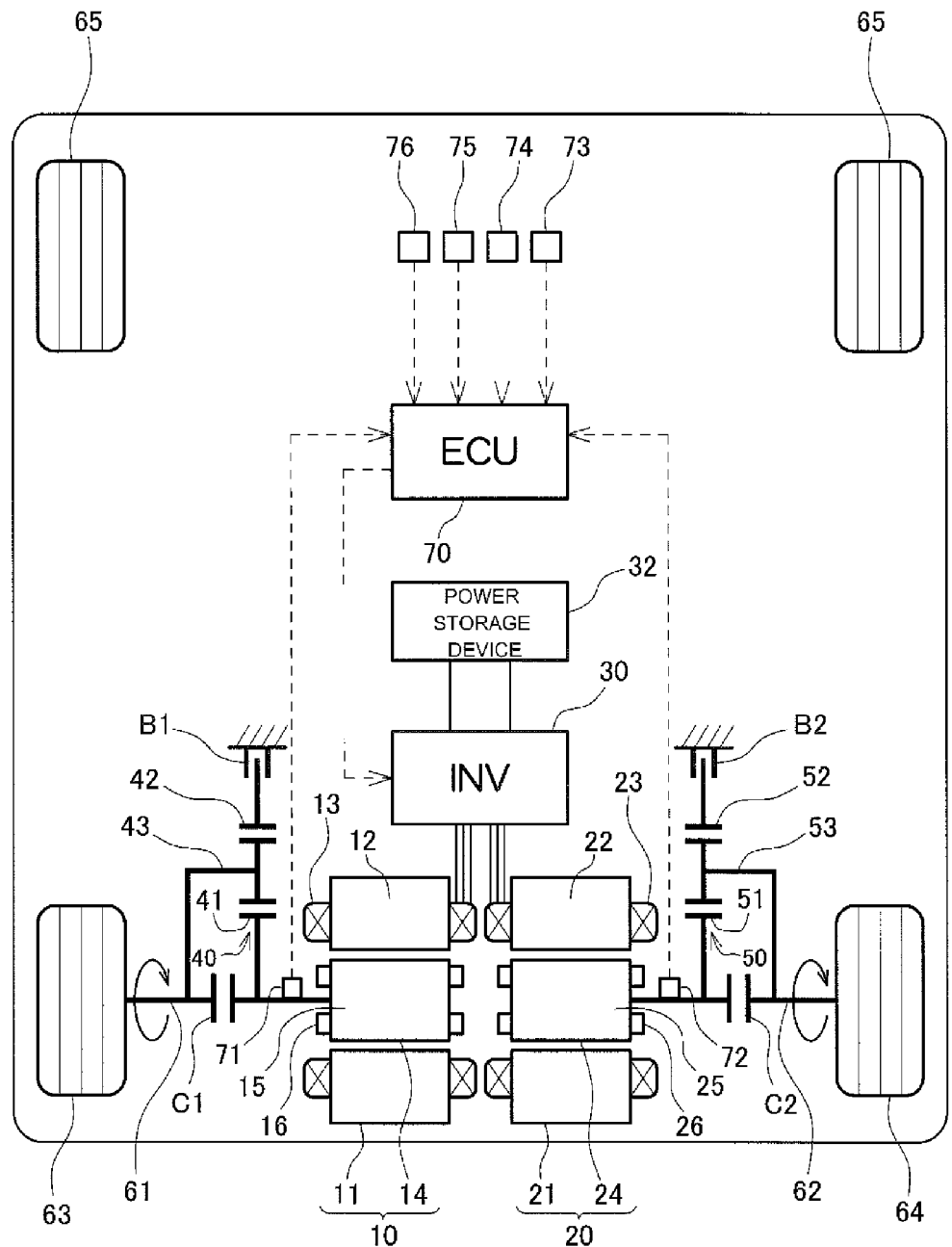
FIG. 11 shows a diagram of another schematic configuration diagram of the driving power distribution device according to the embodiment of the present invention.

For example, in the structure in FIG. 11, the first speed change mechanism 40 has a clutch C1 for switching between engagement/release of the sun gear 41 and the carrier 43, and a brake B1 for switching between restriction/allowance of rotation of the ring gear 42. When the clutch C1 is released, and the brake B1 is engaged to thereby restrict rotation of the ring gear 42, the transmission gear ratio G1 of the first speed change mechanism 40 (transmission gear ratio on the first drive shaft 61 side) is expressed as $(1+\rho1)/\rho1$. Meanwhile, when the clutch C1 is engaged, and the brake B1 is released to thereby allow rotation of the ring gear 42, the transmission gear ratio G1 of the first speed change mechanism 40 (transmission gear ratio on the first drive shaft 61 side) becomes 1. Likewise, the second speed change mechanism 50 has a clutch C2 for switching engagement/release of the sun gear 51 and the carrier 53, and a brake B2 for switching between restriction/allowance of rotation of the ring gear 52. When the clutch C2 is released, and the brake B2 is engaged to thereby restrict rotation of the ring gear 52, the transmission gear ratio G2 of the second speed change mechanism 50 (transmission gear ratio on the second drive shaft 62 side) is expressed as $(1+\rho2)/\rho2$. Meanwhile, when the clutch C2 is engaged, and the brake B2 is released to thereby allow rotation of the ring gear 52, the transmission gear ratio G2 of the second speed change mechanism 50 (transmission gear ratio on the second drive shaft 62 side) becomes 1.

When the clutch C1 of the first speed change mechanism 40 is released while the brake B1 is engaged, and when the clutch C2 of the second speed change mechanism 50 is released while the brake B2 is engaged, the transmission gear ratio G1 on the first drive shaft 61 side and the transmission gear ratio G2 on the second drive shaft 62 side become equal. Also, when the clutch C1 of the first speed change mechanism 40 is engaged while the brake B1 is released, and when the clutch C2 of the second speed change mechanism 50 is engaged while the brake B2 is released, the transmission gear ratio G1 on the first drive shaft 61 side and the transmission gear ratio G2 on the second drive shaft 62 side become equal. Meanwhile, when the clutch C1 of the first speed change mechanism 40 is engaged and the brake B1 is released, and when the clutch C2 of the second speed change mechanism 50 is released and the brake B2 is engaged, the transmission gear ratio G1 on the first drive shaft 61 side becomes smaller than the transmission gear ratio G2 on the second drive shaft 62 side. Then, when the clutch C1 of the first speed change mechanism 40 is released and the brake B1 is engaged, and when the clutch C2 of the second speed change mechanism 50 is engaged and the brake 52 is released, the transmission gear ratio G1 on the first drive shaft 61 side becomes greater than the transmission gear ratio G2 on the second drive shaft 62 side. Thus, the difference between the transmission gear ratio G1 on the first drive shaft 61 side and the transmission gear ratio G2 on the second drive shaft 62 side is changed. The electronic control unit 70 controls engagement/release of each of the clutches C1 and C2 and the brakes B1 and B2, to thereby control the difference between the transmission gear ratios G1 and G2. As for the structure for changing the difference between the transmission gear ratios G1 and G2, in addition to the structure example in FIG. 11, it is also possible to adopt various structures, such as, for example, a structure in which the transmission gear ratios of the first speed change mechanism 40 and the second speed change mechanism 50 are changed in three stages or more.

Figure 12:
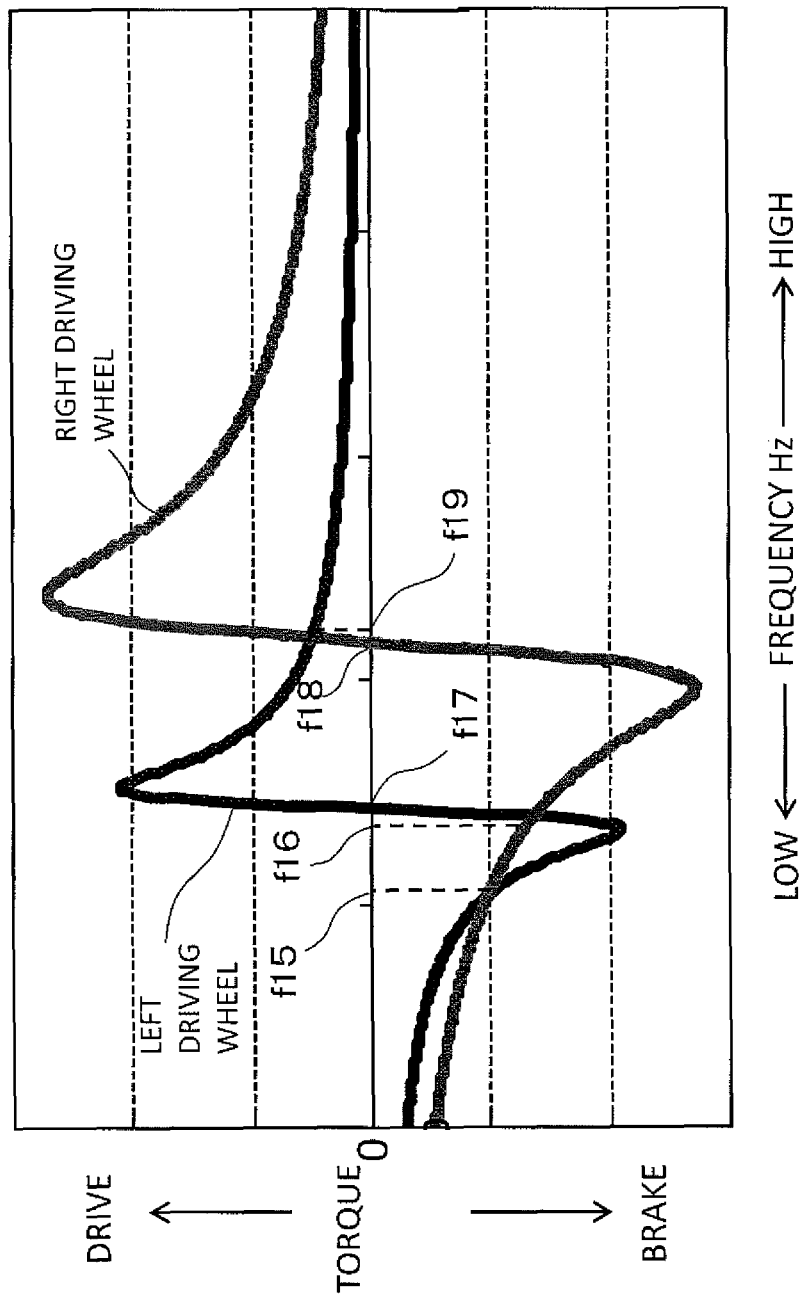
FIG. 12 shows a diagram of an example of torque characteristics with respect to the power supply frequency when a difference is generated in a transmission gear ratio between a first speed change mechanism and a second speed change mechanism.

Because the rotational difference is generated between the first rotor 14 and the second rotor 24 by generating the difference in the transmission gear ratio between the first speed change mechanism 40 and the second speed change mechanism 50, the first induction machine 10 and the second induction machine 20 have different sync frequencies. As a result, similar to the case where the difference is generated in the number of poles between the first induction machine 10 and the second induction machine 20, for example, as shown in FIG. 12, torque characteristics with respect to power supply frequency differ between the left driving wheel 63 (first drive shaft 61) and the right driving wheel 64 (second drive shaft 62). The example in FIG. 12 shows the torque characteristics obtained when the transmission gear ratio 61 on the first drive shaft 61 side is smaller than the transmission gear ratio G2 on the second drive shaft 62 side and when the rotational speed of the left driving wheel 63 is higher than the rotational speed of the right driving wheel 64. The sync frequency 117 of the first induction machine 10 becomes lower than the sync frequency 118 of the second induction machine 20, and the power supply frequency corresponding to the peak of the torque of the left driving wheel 63 becomes lower than the power supply frequency corresponding to the peak of the torque of the right driving wheel 64.

Therefore, if the difference in the transmission gear ratio is generated between the first speed change mechanism 40 and the second speed change mechanism 50, a difference in torques corresponding to the same frequency is also generated between the first rotor 14 and the second rotor 24, even if the common alternating currents of the same frequency are fed to the stator windings 13 and 23, and thus, a torque difference is generated between the left driving wheel 63 and the right driving wheel 64. A this time, if the difference in the transmission gear ratio between the first speed change mechanism 40 and the second speed change mechanism 50 is changed, the difference in torques corresponding to the same frequency between the first rotor 14 and the second rotor 24 is changed, thereby changing the torque difference between the left driving wheel 63 and the right driving wheel 64 and further changing the total torque of the left driving wheel 63 and the right driving wheel 64. Therefore, the torque difference between the first rotor 14 and the second rotor 24 can be adjusted in accordance with the frequency f0 of the common alternating currents to be fed to the stator windings 13 and 23 by the shared inverter 30 and the difference in the transmission gear ratio between the first drive shaft 61 side and the second drive shaft 62 side, thereby adjusting the torque distribution to the left driving wheel 63 (first drive shaft 61) and the right driving wheel 64 (second drive shaft 62).

In the structure example where the difference in the transmission gear ratio between the first speed change mechanism 40 and the second speed change mechanism 50 can be changed, if, during turning of the vehicle, the target total torque $\Sigma Tr^*$ on the driving side is large with respect to the target torque difference $\Delta Tr^*$, the target torque $Trl^*$ of the left driving wheel 63 and the target torque $Trr^*$ of the right driving wheel 64 are both set to the driving side. In this case, if, for example, as shown in FIG. 4, the yaw rate γ and the target yaw moment $Mr^*$ are in the same direction, and the target torque $Trl^*$ on the driving side of the left driving wheel 63 having the higher rotational speed becomes greater than the target torque $Trr^*$ on the driving side of the right driving wheel 64 having the lower rotational speed, by increasing the transmission gear ratio G1 of the first speed change mechanism 40 or reducing the transmission gear ratio G2 of the second speed change mechanism 50, the difference between the transmission gear ratios G1 and G2 is changed such that the transmission gear ratio G1 on the first drive shaft 61 side becomes greater than the transmission gear ratio G2 on the second drive shaft 62 side. Alternatively, the first speed change mechanism 40 and the second speed change mechanism 50 are allowed to have equal transmission gear ratios. The frequency f0 of alternating current is set to be in the range where the driving torque of the left driving wheel 63 becomes greater than the driving torque of the right driving wheel 64, and in the example of FIG. 2, it is set to be in the range above f4. Thus, the degree of freedom for controlling the frequency f0 of alternating current is enhanced, and the turning performance of the vehicle is improved. Moreover, the amplitude A0 of alternating current is set such that the total torque of the left driving wheel 63 and the right driving wheel 64 becomes the target total torque $\Sigma Tr^*$.

Meanwhile, if, for example, as shown in FIG. 5, the yaw rate γ and the target yaw moment $Mr^*$ are in opposite directions, and the target torque $Trl^*$ on the driving side of the left driving wheel 63 having the higher rotational speed becomes smaller than the target torque $Trr^*$ on the driving side of the right driving wheel 64 having the lower rotational speed, by reducing the transmission gear ratio G1 of the first speed change mechanism 40 or increasing the transmission gear ratio G2 of the second speed change mechanism 50, the difference between the transmission gear ratios G1 and G2 is changed such that the transmission gear ratio G1 on the first drive shaft 61 side becomes smaller than the transmission gear ratio G2 on the second drive shaft 62 side. The frequency f0 of alternating current is set to be in the range where the driving torque of the left driving wheel 63 becomes smaller than the driving torque of the right driving wheel 64, and in the example of FIG. 12, it is set to be in the range above f19. Thus, the degree of freedom for controlling the frequency f0 of alternating current is enhanced, and the travelling stability of the vehicle is improved. Moreover, the amplitude A0 of alternating current is set such that the total torque of the left driving wheel 63 and the right driving wheel 64 becomes the target total torque $\Sigma Tr^*$.

Also, if, during turning of the vehicle, the target total torque $\Sigma Tr^*$ on the braking side is large with respect to the target torque difference $\Delta Tr^*$, the target torque $Trl^*$ of the left driving wheel 63 and the target torque $Trr^*$ of the right driving wheel 64 are both set to the braking side. In this case, if, for example, as shown in FIG. 6, the yaw rate γ and the target yaw moment $Mr^*$ are in the same direction, and the target torque $Trl^*$ on the braking side of the left driving wheel 63 having the higher rotational speed becomes smaller than the target torque $Trr^*$ on the braking side of the right driving wheel 64 having the lower rotational speed, the difference between the transmission gear ratios G1 and G2 is changed such that the transmission gear ratio G1 on the first drive shaft 61 side becomes greater than the transmission gear ratio G2 on the second drive shaft 62 side. Alternatively, the first speed change mechanism 40 and the second speed change mechanism 50 are allowed to have equal transmission gear ratios. The frequency f0 of alternating current is set to be in the range where the braking torque of the left driving wheel 63 becomes smaller than the braking torque of the right driving wheel 64, and in the example of FIG. 2, it is set to be in the range below f1. Thus, the degree of freedom for controlling the frequency f0 of alternating current is enhanced, and the turning performance of the vehicle is improved. Moreover, the amplitude A0 of alternating current is set such that the total torque of the left driving wheel 63 and the right driving wheel 64 becomes the target total torque ΣTr*. Meanwhile, if, for example, as shown in FIG. 5, the yaw rate γ and the target yaw moment Mr* are in opposite directions, and the target torque Trl* on the braking side of the left driving wheel 63 having the higher rotational speed becomes greater than the target torque Trr* on the braking side of the right driving wheel 64 having the lower rotational speed, the difference between the transmission gear ratios G1 and G2 is changed such that the transmission gear ratio G1 on the first drive shaft 61 side becomes smaller than the transmission gear ratio G2 on the second drive shaft 62 side. The frequency f0 of alternating current is set to be in the range where the braking torque of the left driving wheel 63 becomes greater than the braking torque of the right driving wheel 64, and in the example of FIG. 12, it is set to be in the range above f15 and below f16. Thus, the degree of freedom for controlling the frequency f0 of alternating current is enhanced, and the travelling stability of the vehicle is improved. Moreover, the amplitude A0 of alternating current is set such that the total torque of the left driving wheel 63 and the right driving wheel 64 becomes the target total torque ΣTr*.

Also, if, during turning of the vehicle, the target total torque ΣTr* is small with respect to the target torque difference ΔTr*, one of the target torque Trl* of the left driving wheel 63 and the target torque Trr* of the right driving wheel 64 is set to the driving side, and the other one is set to the braking side. In this case, if, as shown in FIG. 10, the yaw rate γ and the target yaw moment Mr* are in the same direction, and the target torque Trl* of the left driving wheel 63 having the higher rotational speed is set to the driving side, and the target torque Trr* of the right driving wheel 64 having the lower rotational speed is set to the braking side, the difference between the transmission gear ratios G1 and G2 is changed such that the transmission gear ratio G1 on the first drive shaft 61 side becomes smaller than the transmission gear ratio G2 on the second drive shaft 62 side. The frequency f0 of alternating current is set to be in the range where the driving torque acts on the left driving wheel 63 and the braking torque acts on the right driving wheel 64, and in the example of FIG. 12, it is set to be in the range above f17 and below f18. Thus, it is possible to enhance the degree of freedom for controlling the frequency f0 of alternating current and increase the yaw moment in the same direction as the yaw rate γ, thereby further improving the turning performance of the vehicle. Moreover, the amplitude A0 of alternating current is set such that the total torque of the left driving wheel 63 and the right driving wheel 64 becomes the target total torque ΣTr*. As such, when the frequency f0 of alternating current is adjusted so as to apply the driving torque to, of the first and second drive shafts 61 and 62, the drive shaft having the higher rotational speed and apply the braking torque to the drive shaft having the lower rotational speed, the transmission gear ratio on the side of the drive shaft having the higher rotational speed is made smaller than the transmission gear ratio on the side of the drive shaft having the lower rotational speed.

Meanwhile, if, for example, as shown in FIG. 8, the yaw rate γ and the target yaw moment Mr* are in opposite directions, and if the target torque Trl* of the left driving wheel 63 having the higher rotational speed is set to the braking side, and the target torque Trr* of the right driving wheel 64 having the lower rotational speed is set to the driving side, the difference between the transmission gear ratios G1 and G2 is changed such that the transmission gear ratio G1 on the first drive shaft 61 side becomes greater than the transmission gear ratio 52 on the second drive shaft 62 side. Alternatively, the first speed change mechanism 40 and the second speed change mechanism 50 are allowed to have equal transmission gear ratios. The frequency f0 of alternating current is set to be in the range where the braking torque acts on the left driving wheel 63 and the driving torque acts on the right driving wheel 64, and in the example of FIG. 2, it is set to be in the range above f2 and below f3. Thus, it is possible to enhance the degree of freedom for controlling the frequency 50 of alternating current and increase the yaw moment in the direction opposite to the yaw rate γ, thereby further improving the traveling stability of the vehicle. Moreover, the amplitude A0 of alternating current is set such that the total torque of the left driving wheel 63 and the right driving wheel 64 becomes the target total torque ΣTr*. As such, when the frequency f0 of alternating current is adjusted so as to apply the braking torque to, of the first and second drive shafts 61 and 62, the drive shaft having the higher rotational speed and apply the driving torque to the drive shaft having the lower rotational speed, the transmission gear ratio on the side of the drive shaft having the higher rotational speed is made equal to or greater than the transmission gear ratio on the side of the drive shaft having the lower rotational speed.

Also, when the target yaw moment Mr* is 0, such as, for example, when the vehicle is traveling straight, and the target torque Trl* of the left driving wheel 63 and the target torque Trr* of the right driving wheel 64 are set to be equal, the first speed change mechanism 40 and the second speed change mechanism 50 are allowed to have equal transmission gear ratios.

In the above embodiment, adjusting the torque distribution to the left driving wheel 63 and the right driving wheel 64 has been described. However, the present invention can be used for purposes other than adjusting the torque distribution to the left driving wheel 63 and the right driving wheel 64. Further, the present invention can be used for purposes other than vehicles.

Although the embodiment for carrying out the present invention has been described, the present invention is not intended to be limited to such an embodiment and can be modified in various applications without departing from the scope of the present invention.

According to the present embodiment, because, when a rotational difference is generated between the first induction machine and the second induction machine, the shared power conversion system adjusts the frequency of common alternating currents to be fed to the first and second induction machines, thereby adjusting torque distribution to the first driving wheel and the second driving wheel, there is no need to perform power conversion for adjusting alternating current of the first induction machine and power conversion for adjusting alternating current of the second induction machine in an independent manner, and the structure of the power conversion system can be simplified. As a result, the structure for adjusting the torque distribution to the first driving wheel and the second driving wheel can be simplified.

The invention claimed is:

1. A driving power distribution device that adjusts torque distribution to a first drive shaft and a second drive shaft, the device comprising:
   a first induction machine that transmits a torque to the first drive shaft;
   a second induction machine that transmits a torque to the second drive shaft; and
   a shared power conversion system that applies common alternating currents to the first induction machine and the second induction machine, wherein
   a frequency of the common alternating currents is set based on: a rotational speed and a target torque value of the first induction machine, and separately a rotational speed and a target torque value of the second induction machine.

2. The driving power distribution device according to claim 1, wherein an amplitude of the common alternating currents is set based on the rotational speed and the target torque value of the first induction machine and the rotational speed and the target torque value of the second induction machine.

3. The driving power distribution device according to claim 1, wherein:
   a difference in a number of poles between the first induction machine and the second induction machine is changeable; and
   the frequency of the common alternating currents and the difference in the number of poles are set based on the rotational speed and the target torque value of the first induction machine and the rotational speed and the target torque value of the second induction machine.

4. The driving power distribution device according to claim 2, wherein:
   a difference in a number of poles between the first induction machine and the second induction machine is changeable; and
   the frequency of the common alternating currents and the difference in the number of poles are set based on the rotational speed and the target torque value of the first induction machine and the rotational speed and the target torque value of the second induction machine.

5. The driving power distribution device according to claim 1, wherein when a rotational difference is generated between the first induction machine and the second induction machine, in order to adjust the frequency of the common alternating currents so as to apply a driving torque to, of the first and second induction machines, the induction machine having a higher rotational speed and apply a braking torque to the induction machine having a lower rotational speed, a difference in a number of poles is set such that the number of poles of the induction machine having the higher rotational speed becomes smaller than the number of poles of the induction machine having the lower rotational speed.

6. The driving power distribution device according to claim 2, wherein when a rotational difference is generated between the first induction machine and the second induction machine, in order to adjust the frequency of the common alternating currents so as to apply a driving torque to, of the first and second induction machines, the induction machine having a higher rotational speed and apply a braking torque to the induction machine having a lower rotational speed, a difference in a number of poles is set such that the number of poles of the induction machine having the higher rotational speed becomes smaller than the number of poles of the induction machine having the lower rotational speed.

7. The driving power distribution device according to claim 3, wherein when a rotational difference is generated between the first induction machine and the second induction machine, in order to adjust the frequency of the common alternating currents so as to apply a braking torque to, of the first and second induction machines, the induction machine having a higher rotational speed and apply a driving torque to the induction machine having a lower rotational speed, the difference in the number of poles is set such that the number of poles of the induction machine having the higher rotational speed becomes equal to or greater than the number of poles of the induction machine having the lower rotational speed.

8. The driving power distribution device according to claim 4, wherein when a rotational difference is generated between the first induction machine and the second induction machine, in order to adjust the frequency of the common alternating currents so as to apply a braking torque to, of the first and second induction machines, the induction machine having a higher rotational speed and apply a driving torque to the induction machine having a lower rotational speed, the difference in the number of poles is set such that the number of poles of the induction machine having the higher rotational speed becomes equal to or greater than the number of poles of the induction machine having the lower rotational speed.

9. The driving power distribution device according to claim 1, wherein:
   a difference between a transmission gear ratio on a first drive shaft side and a transmission gear ratio on a second drive shaft side is changeable, the transmission gear ratio on the first drive shaft side being a transmission gear ratio from the first induction machine to the first drive shaft, the transmission gear ratio on the second drive shaft side being a transmission gear ratio from the second induction machine to the second drive shaft; and
   the difference in the transmission gear ratio between the first drive shaft and the second drive shaft is set based on the rotational speed and the target torque value of the first induction machine and the rotational speed and the target torque value of the second induction machine.

10. The driving power distribution device according to claim 9, wherein when a rotational difference is generated between the first drive shaft and the second drive shaft, in order to adjust the frequency of the common alternating currents so as to apply a driving torque to, of the first and second drive shafts, the drive shaft having a higher rotational speed and apply a braking torque to the drive shaft having a lower rotational speed, the difference in the transmission gear ratio is set such that the transmission gear ratio on the side of the drive shaft having the higher rotational speed becomes smaller than the transmission gear ratio on the side of the drive shaft having the lower rotational speed.

11. The driving power distribution device according to claim 9, wherein when a rotational difference is generated between the first drive shaft and the second drive shaft, in order to adjust the frequency of the common alternating currents so as to apply a braking torque to, of the first and second drive shafts, the drive shaft having a higher rotational speed and apply a driving torque to the drive shaft having a lower rotational speed, the difference in the transmission gear ratio is set such that the transmission gear ratio on the side of the drive shaft having the higher rotational speed becomes equal to or greater than the transmission gear ratio on the side of the drive shaft having the lower rotational speed.

12. The driving power distribution device according to claim 1, wherein:
   the first drive shaft rotates with one of a left driving wheel and a right driving wheel of a vehicle; and
   the second drive shaft rotates with the other one of the left driving wheel and the right driving wheel of the vehicle.

13. The driving power distribution device according to claim 2, wherein the amplitude of the common alternating currents is set independently of maximum currents.

14. A vehicle, comprising:
   the driving power distribution device according to claim 1,
   wherein the frequency of the common alternating currents is set independently of a speed of the vehicle.

* * * * *